Sept. 2, 1958 W. H. MARTIN 2,850,713
CONNECTING MEANS FOR WELDING CABLE AND TRANSFORMER
Filed June 14, 1954 2 Sheets-Sheet 1
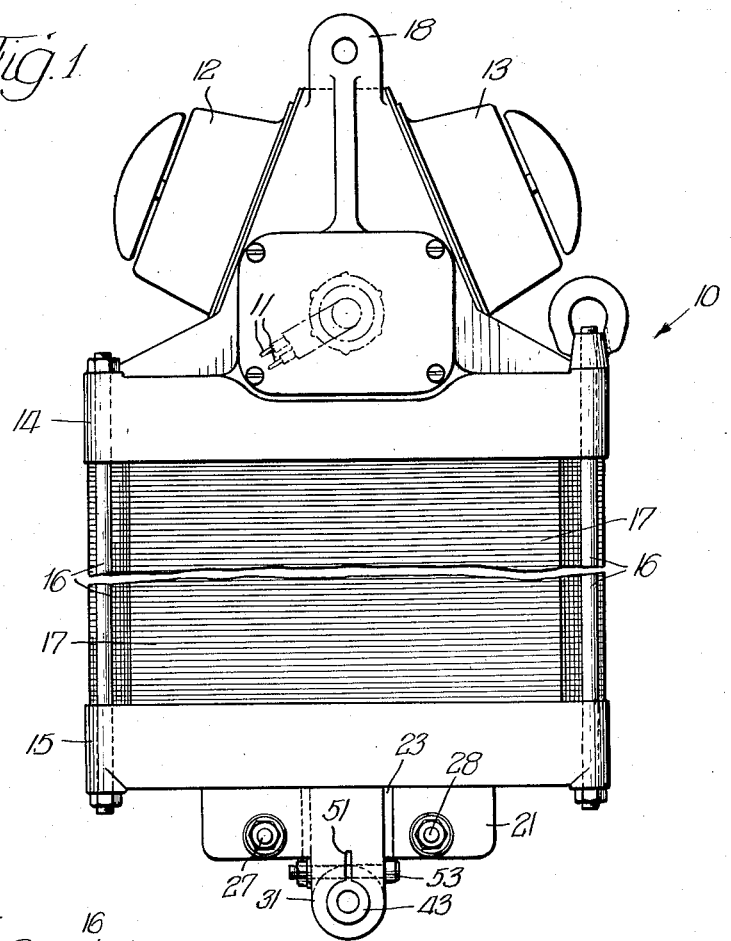
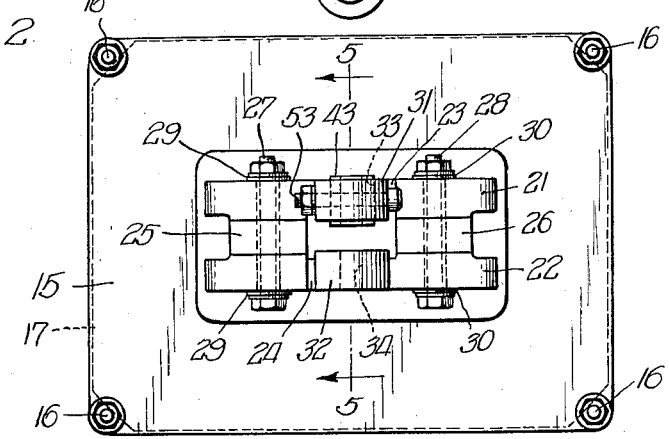
INVENTOR.
William H. Martin,
BY
Robert R. Lockwood
Atty.

Sept. 2, 1958  W. H. MARTIN  2,850,713
CONNECTING MEANS FOR WELDING CABLE AND TRANSFORMER
Filed June 14, 1954  2 Sheets-Sheet 2
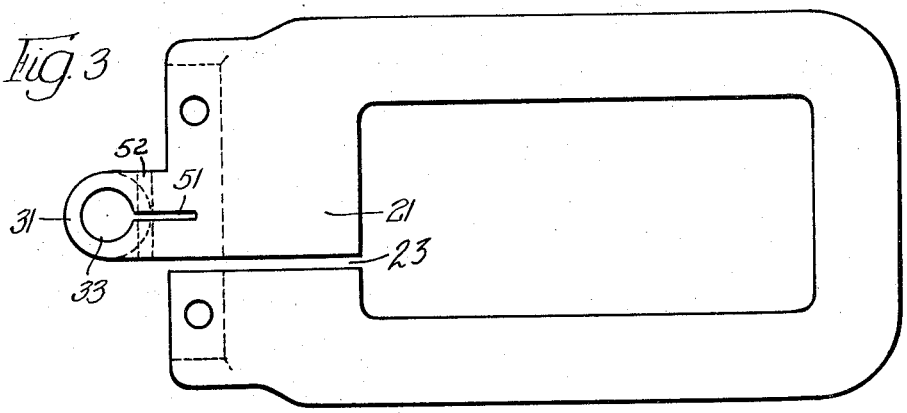
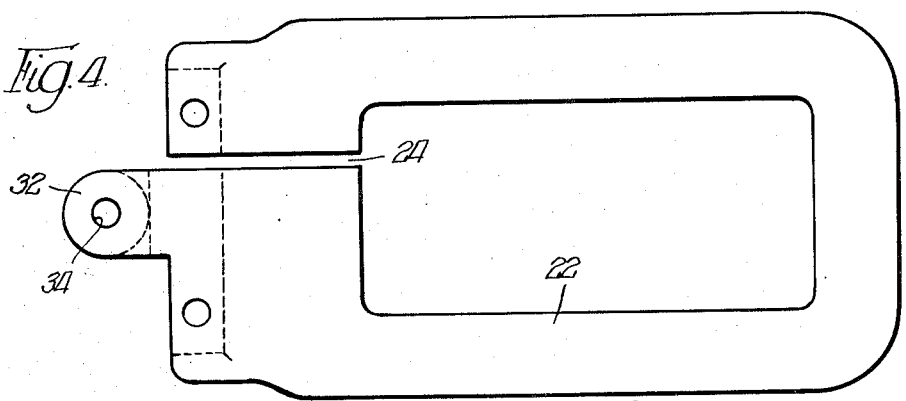
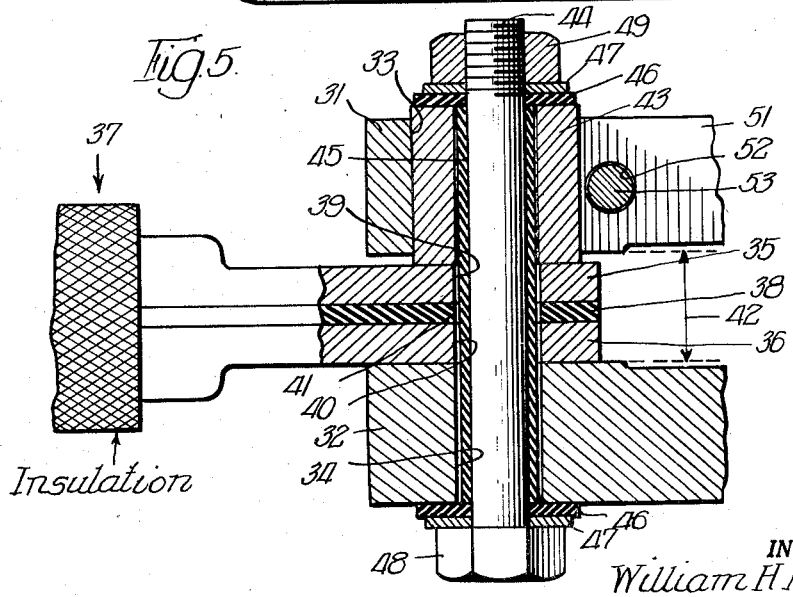
INVENTOR.
William H. Martin,
BY
Robert R. Lockwood
Atty.

United States Patent Office 2,850,713
Patented Sept. 2, 1958

2,850,713

CONNECTING MEANS FOR WELDING CABLE AND TRANSFORMER

William H. Martin, Grosse Pointe, Mich., assignor, by mesne assignments, to Thompson Industries, Inc., Indianapolis, Ind., a corporation of Massachusetts Application June 14, 1954, Serial No. 436,668

6 Claims. (Cl. 339—150)

This invention relates, generally, to electric terminal connecting means and it has particular relation to means for connecting a two conductor welding cable to the terminals of the secondary winding of a welding transformer.

It is conventional practice to employ a portable transformer for supplying current to a welding gun for making spot welds in the fabrication of automobile bodies and the like. The transformer includes a primary winding for energization from a 220–440 volt alternating current source and a secondary winding that is connected by a two conductor welding cable to the welding gun. The secondary winding may be formed by two copper castings, each providing a single turn around the magnetic circuit which also links the primary winding of the transformer. These castings can be connected in series or in parallel depending upon the current and voltage required for performing the welding operation.

The castings forming the secondary winding of course are relatively stationarily mounted on the transformer and each has a platelike terminal member or terminal pad for connection to the welding cable. These terminal members or pads are spaced apart to receive therebetween a pair of insulated spaced apart terminals of the welding cable the total thickness of which terminals and insulation may vary.

Accordingly, among the objects of this invention are: To provide simple, efficient and economical means for interconnecting the terminals of the welding cable with the terminal members of the secondary winding of the welding transformer; to accommodate welding cable terminals of varying thickness; to provide a slidable connection to one of the terminals of the secondary winding; and to provide for clamping the slidable connection in the secondary winding terminal containing it.

Other objects of this invention will, in part, be obvious and in part appear hereinafter.

This invention is disclosed in the embodiment thereof shown in the accompanying drawings and it comprises the features of construction, combination of elements and arrangement of parts which will be exemplified in the construction hereinafter set forth and the scope of the application of which will be indicated in the appended claims.

For a more complete understanding of the nature and scope of this invention, reference can be had to the following description taken together with the accompanying drawings, in which:

Figure 1 is a view, in side elevation, of a portable welding transformer in which the present invention is embodied;

Figure 2 is a bottom plan view of the transformer shown in Figure 1;

Figure 3 is a top plan view of one of the castings making up the secondary winding;

Figure 4 is a top plan view of the other casting which is employed for making up the secondary winding; and Figure 5 is a vertical sectional view taken generally along the line 5—5 of Figure 2 and showing at an enlarged scale certain of the details of construction of the present invention.

Referring now particularly to Figure 1 of the drawings, it will be observed that the reference character 10 designates, generally, a portable welding transformer which may be connected by conductors 11 to a suitable alternating current source such as a source of 220–440 volts. However, it will be understood that these voltages are mentioned merely for illustrative purposes and that the transformer 10 can be designed for use with other primary voltages. Tap switches 12 and 13 mounted on an end frame 14 can be employed for varying the connections to the primary winding (not shown) of the transformer 10. At the lower end of the transformer 10 is another end frame 15 and the end frames 14 and 15 are connected by through bolts 16 for clamping transformer laminations 17 therebetween. An eye member 18 is formed integrally with the end frame 14 to permit suspension of the transformer 10 in accordance with conventional practice.

The secondary winding of the transformer 10 is formed preferably by copper castings 21 and 22 which are shown in Figures 3 and 4 of the drawings. Each of these copper castings constitutes a single turn for the secondary winding and each is provided with a slot 23—24 which can be formed by suitable milling operation after the castings 21 and 22 have been cast. Depending upon the current and voltage to be supplied by the secondary winding, the castings 21 and 22 can be connected either in series or in parallel. Figure 2 of the drawings shows connector blocks 25 and 26 arranged to interconnecting the castings 21 and 22 in parallel. These connector blocks are clamped to the castings 21 and 22 by bolts 27 and 28. Insulating washers 29 and 30 under the heads and nuts of the bolts 27 and 28 serve to insulate the latter and at the same time permit the castings 21 and 22 to be clamped securely to the connector blocks 25 and 26.

The transformer 10 can be constructed in different ratings. For example, the particular construction shown has the rating of 75 kva. The current flow from the secondary winding formed by the copper castings 21 and 22 may be of the order of several thousand amperes, for example from 10,000 to 15,000 amperes. The construction is such that the copper castings 21 and 22 are rigidly stationarily mounted in the transformer 10. In order to provide connections to the copper castings 21 and 22 each is provided respectively with a platelike terminal member or pad 31 and 32. These terminal members or pads 31 and 32 are spaced apart a predetermined distance and are relatively stationary. For example, they may be spaced three-fourths of an inch apart. They are provided with apertures 33 and 34 respectively which are aligned, the aperture 33 being of larger diameter than the aperture 34 for a purpose which will be apparent presently.

Connection with the terminal members or pads 31 and 32 is provided by apertured terminals 35 and 36 of a two conductor welding cable that is shown generally at 37. It will be understood that the other end of the welding cable 37 is connected to a welding gun the terminals or electrodes of which are arranged to engage the metallic parts to be spot welded. Interposed between the terminals 35 and 36 is a layer 38 of insulation which serves to maintain them in insulated spaced relation. It will be understood that the terminals 35 and 36 are connected by insulated flexible leads within the welding cable 37 in a manner which is conventional to terminals, similar to the terminals 35 and 36 at the other end. Aligned apertures 39, 40 and 41 are provided in the terminals 35 and 36 and in the layer 38 of insulation and these apertures are arranged, as shown in Figure 5 to be positioned collinearly with respect to the apertures 33 and 34 in the terminal members or pads 31 and 32.

Since the spacing shown at 42 in Figure 5 of drawings between the terminal members or pads 31 and 32 is fixed and since the overall thickness of the terminals 35 and 36 and the layer 38 of insulation may vary slightly, provision is made in accordance with this invention for establishing good current carrying connections between the terminal members or pads 31 and 32 and the terminals 35 and 36 of the welding cable 37. For this purpose a copper conducting bushing 43 is inserted within the large diameter aperture 33 in the terminal member or pad 31 and its length, as shown in Figure 5, is slightly greater than the thickness of this terminal member or pad. This permits the making of a good electrical connection to the terminals 35 and 36 by positioning the latter flatwise against the terminal or pad 32 and then adjusting the conducting bushing 43 until it engages the juxtaposed surface of the terminal 35.

With a view to providing contact engagement under pressure an insulated bolt 44 is employed for clamping the assembly just described together. It will be observed that the bolt 44 extends through the aperture 34 in the terminal member or pad 32, through the apertures 40, 41 and 39 and the central opening in the conducting bushing 43. The insulation is provided by an insulating sleeve 45 which also extends through these apertures and surrounds the body of the bolt 44. In addition insulating washers 46 are provided and bear against the outer end of the bushing 43 and the outer side of the platelike terminal or pad 32. Metallic washers 47 overlie the insulating washers 46, one being positioned underneath the head of the bolt 44 and the other being positioned underneath a nut 49 which, when tightened, serves to hold the parts in good conducting relationship.

It is desirable to provide intimate contact engagement between the conducting bushing 43 and the terminal member pad 31 in which it is slidably mounted. For this purpose a slot 51, Figure 3, is provided in the terminal member or pad 31 and it extends radially from the aperture 33 therein. The slot 51 provides a slight degree of flexibility in the terminal member or pad 31. An aperture 52 extends through the walls of the slot 51 and a transverse bolt 53 is inserted therein which, when tightened, serves to clamp the surface forming the bore of the aperture 33 tightly against the periphery of the conducting bushing 43.

The construction just described permits the use of welding cable 37 having terminals 35 and 36 spaced apart by a layer 38 of insulation and with the overall thickness varying up to the spacing 42 between the terminal members or pads 31 and 32 and at the same time permits the proper and desired interconnection without requiring that the terminal members or pads 31 and 32 themselves be in any way adjustable or without requiring substantial modification therein to effect the desired connection thereto.

Since certain changes can be made in the foregoing construction and different embodiments of the invention can be made without departing from the spirit and scope thereof, it is intended that all matter shown in the accompanying drawings and described hereinbefore shall be interpreted as illustrative and not in a limiting sense.

What is claimed as new is:

1. Means for connecting an insulated platelike pair of apertured terminals of a welding cable likely to vary in total thickness to the secondary winding of a welding transformer comprising, in combination, a pair of relatively stationary platelike terminal members connected for energization to said secondary winding for receiving therebetween said terminals of said welding cable and spaced apart a distance equal to the greatest thickness thereof likely to be encountered, said terminal members having collinear openings for alignment with the aperture in said terminals of said welding cable, a conducting bushing lining the opening in one of said terminal members and having a length greater than the thickness thereof; an insulated bolt extending through the openings in said bushing, terminals of said welding cable, and the other terminal member and on being tightened clamping said terminals of said welding cable between said bushing and said other terminal member; and means for clamping said conducting bushing to said one terminal member.

2. Means for connecting an insulated platelike pair of apertured terminals of a welding cable likely to vary in total thickness to the secondary winding of a welding transformer comprising, in combination, a pair of relatively stationary platelike terminal members connected for energization to said secondary winding for receiving therebetween said terminals of said welding cable and spaced apart a distance equal to the greatest thickness thereof likely to be encountered, said terminal members having collinear openings for alignment with the aperture in said terminals of said welding cable, a conducting bushing lining the opening in one of said terminal members and having a length greater than the thickness thereof; an insulated bolt extending through the openings in said bushing, terminals of said welding cable, and the other terminal member and on being tightened clamping said terminals of said welding cable between said bushing and said other terminal member; there being a slot in said one terminal member extending radially from said greater diameter opening therein, and a bolt extending transversely through said one terminal member and across said slot therein and on being tightened clamping said conducting bushing to said one terminal member.

3. Means for connecting an insulated platelike pair of apertured terminals of a welding cable likely to vary in total thickness to the secondary winding of a welding transformer comprising, in combination, a pair of relatively stationary platelike terminal members connected for energization to said secondary winding for receiving therebetween said terminals of said welding cable and spaced apart a distance equal to the greatest thickness thereof likely to be encountered, said terminal members having collinear openings for alignment with the aperture in said terminals of said welding cable, a conducting bushing lining the opening in one of said terminal members and having a length greater than the thickness thereof; an insulating bushing extending through the openings in said bushing, terminals of said welding cable, and said other terminal member; a bolt extending through said insulating bushing with a head at one end and a nut at the other, insulating washers underneath said head and said nut, said nut on being tightened on said bolt clamping said terminals of said welding cable between said bushing and said other terminal member, there being a slot in said one terminal member extending radially from the opening therein, and a bolt extending transversely through said one terminal member and across said slot therein and on being tightened clamping said conducting bushing to said one terminal member.

4. Means for connecting an insulated platelike pair of apertured terminals of a welding cable likely to vary in total thickness to the secondary winding of a welding transformer comprising, in combination, a pair of relatively stationary platelike terminal members connected for energization to said secondary winding for receiving therebetween said terminals of said welding cable and spaced apart a distance equal to the greatest thickness thereof likely to be encountered, said terminal members having collinear openings for alignment with the aperture in said terminals of said welding cable with one opening being of greater diameter than the other, a conducting bushing lining said greater diameter opening and having a length greater than the thickness of the terminal member containing the same; an insulated bolt extending through the openings in said bushing, terminals of said welding cable, and the other terminal member and on being tightened clamping said terminals of said welding cable between said bushing and said other terminal member; and means on said one terminal member for clamping said conducting bushing thereto.

5. Means for connecting an insulated platelike pair of apertured terminals of a welding cable likely to vary in total thickness to the secondary winding of a welding transformer comprising, in combination, a pair of relatively stationary platelike terminal members connected for energization to said secondary winding for receiving therebetween said terminals of said welding cable and spaced apart a distance equal to the greatest thickness thereof likely to be encountered, said terminal members having collinear openings for alignment with the aperture in said terminals of said welding cable, a conducting bushing lining the opening in one of said terminal members and having a length greater than the thickness of the terminal member containing the same; an insulating bushing extending through the openings in said conducting bushing, terminals of said welding cable, and the other terminal member; a bolt extending through said insulating bushing with a head at one end and a nut at the other, insulating washers underneath said head and said nut, said nut on being tightened on said bolt clamping said terminals of said welding cable between said conducting bushing and said other terminal member, there being a slot in said one terminal member extending radially from said greater diameter opening therein, and a bolt extending transversely through said one terminal member and across said slot therein and on being tightened clamping said conducting bushing to said one terminal member.

6. Means for connecting an insulated platelike pair of apertured terminals of a welding cable likely to vary in total thickness to the secondary winding of a welding transformer comprising, in combination, a pair of relatively stationary platelike terminal members connected for energization to said secondary winding for receiving therebetween said terminals of said welding cable and spaced apart a distance equal to the greatest thickness thereof likely to be encountered, said terminal members having collinear openings for alignment with the aperture in said terminals of said welding cable with one opening being of greater diameter than the other, a conducting bushing lining said greater diameter opening and having a length greater than the thickness of the terminal member containing the same; an insulating bushing extending through the openings in said conducting bushing, terminals of said welding cable, and said other terminal member; a bolt extending through said insulating bushing with a head at one end and a nut at the other, insulating washers underneath said head and said nut, said nut on being tightened on said bolt clamping said terminals of said welding cable between said conducting bushing and said other terminal member, there being a slot in said one terminal member extending radially from said greater diameter opening therein, and a bolt extending transversely through said one terminal member and across said slot therein and on being tightened clamping said conducting bushing to said one terminal member.

References Cited in the file of this patent

UNITED STATES PATENTS

| | | |
|---|---|---|
| 2,086,784 | Taylor | July 13, 1937 |
| 2,325,810 | Strickland | Aug. 3, 1943 |
| 2,405,148 | Keahey | Aug. 6, 1946 |
| 2,434,475 | Sullivan | Jan. 13, 1948 |
| 2,504,777 | Wreford | Apr. 18, 1950 |
| 2,556,235 | Strickland | June 12, 1951 |